US012759862B2

(12) United States Patent
Houston

(10) Patent No.: US 12,759,862 B2
(45) Date of Patent: Oct. 13, 2026

(54) FLUID RECOVERY METHOD, SYSTEM AND DEVICES THEREFOR

(71) Applicant: Tilted Toner LLC, Dayton, OH (US)

(72) Inventor: Mike Houston, Vandalia, OH (US)

(73) Assignee: Tilted Toner LLC, Dayton, OH (US)

( * ) Notice: Subject to any disclaimer, the term of this patent is extended or adjusted under 35 U.S.C. 154(b) by 0 days.

(21) Appl. No.: 19/022,605

(22) Filed: Jan. 15, 2025

(65) Prior Publication Data

US 2026/0200721 A1 Jul. 16, 2026

(51) Int. Cl.
*B67D 7/02* (2010.01)

(52) U.S. Cl.
CPC .................................. *B67D 7/0288* (2013.01)

(58) Field of Classification Search
CPC .................................................... B67D 7/0288
USPC ........................................................... 141/364
See application file for complete search history.

(56) References Cited

U.S. PATENT DOCUMENTS 2,138,844 A * 12/1938 Erb ........................... B67B 7/28 141/330
5,851,583 A 12/1998 Kronenwetter
6,065,649 A * 5/2000 Scoggins ................. B67D 3/00 141/237
6,213,352 B1 * 4/2001 Boyer, Jr. .............. B65G 65/24 414/419
2020/0032082 A1 1/2020 Matawala

FOREIGN PATENT DOCUMENTS

WO WO2020057458 A1 3/2020

* cited by examiner

*Primary Examiner* — Jason K Niesz
(74) *Attorney, Agent, or Firm* — R. William Graham

(57) ABSTRACT

A fluid recovery method and system for recovering residual fluid residing in a used fluid container includes the steps of (a) suspending the used fluid container above a collection area in a manner which a bottom portion of the used fluid container is unobstructed; and (b) forming a hole in the bottom portion of the used fluid container. A device for recovering residual fluid includes a support for suspending the used fluid container above a collection area in a manner which a bottom portion of the used fluid container is unobstructed and a tool to pierce the bottom portion.

24 Claims, 8 Drawing Sheets

FLUID RECOVERY METHOD, SYSTEM AND DEVICES THEREFOR

FIELD OF THE INVENTION

This invention relates generally to industries which use containers for retaining certain fluids, such as the paint industry, and to how such industries handle residual fluids in the containers.

BACKGROUND TO THE INVENTION

By way of example, high end paint formulation is commonly used on the visible and exposed surfaces of vehicles such as automobiles, trucks, boats, motorcycles and aircraft are often painted using expensive painting methods. The paint is formulated according to a predetermined color formulation. It is laborious and requires high technical skills of colorists. It requires an experienced person, formulating a uniform paint, in which a pigmented base coat is applied to a primed surface to color the surface. The paints in these applications are very expensive, with a gallon of paint costing as much as a thousand dollars and typical costs for average jobs range from the two hundred to five hundred dollars a gallon.

In conventional methods for repairing damage to vehicle paint finishes the entire piece having a damaged area, such as the panel, door, or fender of an automobile, is completely repainted. Though the damaged area may be only a small fraction of the area of the piece, the entire piece is often repainted because of the difficulty, time, and expense involved in obtaining a finished surface that suitably matches the finish of the piece surrounding the damaged area. Although one can readily ascertain the formulation of a vehicle's original base coat paint through manufacturers' disclosures, such information may not be sufficient when the precise ingredients are no longer available, or when the color of the base coat has faded from the sun's ultraviolet rays and thus no longer matches the original color or tint of the base coat. By repainting an entire piece of a vehicle such as a fender, color variations between the new and existing finishes are less likely to be noticed because of the physical break in contiguity between the two finishes.

A further difficulty can occur in matching base coat paint colors of two coat finishes is compounded by the presence of a clear overcoat, which affects the color exhibited by the base coat. Base coat paints often dry to a matte or flat finish, and only appear lustrous upon application of a glossy clear coat. This glossy clear coat can also affect the apparent tint of the base coat. Until the luster has been imparted to a base coat, therefore, one cannot accurately determine whether the base coat is suitably tinted. To obtain an accurately tinted base coat paint, therefore, one often applies a test base coat paint, lets it dry, applies a clear coat, lets it dry, compares the new finish with the existing finish, and modifies the test base coat paint formulation and repeats the process as many times as necessary to perfect the tint. Body shops often apply test coats of base paint and clear coat to separate pieces of sheet metal for comparison purposes to avoid prematurely coating the vehicle with base coat paint or a glossy clear overcoat.

To this end, body shops often use systems to vary the ingredients or concentrations of ingredients in a base coat paint formulation to match more closely the color of an existing finish. Such systems typically contain large volumes of many tints of paint, and as a result are large and cumbersome. For example, one system can contains as many as a hundred tints of paint, and thus this amount of one gallon containers is required. Because of the space occupied by the paint containers, systems generally are used only at body shops and other facilities that have sufficient space to accommodate the system.

Body shops also offer controlled environments in which large vehicle parts can be painted under controlled conditions. To promote even application, drying, and curing of paint, body shops typically contain specially designed paint booths having environmental controls to normalize, among other variables, the temperature, humidity, and circulation of air.

These service providers use a significant amount of paint and currently waste a significant amount of paint as a result of residual paint which is left in a used paint can. It would be extremely beneficial to have a way to reduce the waste of such fluids, e.g., paint, and maximize the use of such fluids within the fluid container.

SUMMARY OF THE INVENTION

Is an object to reduce loss of fluid, in particular paint, in making paint through a mixing process.

It is another object to enhance paint mixing process.

A further object is to reduce environmental waste by minimizing the amount of residual waste fluid which remains in a used fluid container.

Accordingly, one aspect of the present invention is directed to a fluid recovery method for recovering residual fluid residing in a used fluid container, which includes the steps of:

(a) suspending the used fluid container above a collection area, e.g., a secondary container, in a manner which a bottom portion of the used fluid container is unobstructed; and (b) forming a hole in the bottom portion of the used fluid container.

Preferably, a top of the used fluid container remains open to prevent an air lock from occurring. A specific example of the fluid the invention aims to recover is paint.

The step (a) is further characterized to maintain the used fluid container at a predetermined pitch angle causing the residual fluid to flow toward a low point of the used container. The collection area can include a scale upon which said secondary container rests and a tool is provided to puncture a bottom portion of the used fluid container. The step (a) includes employing a bracket having a base, an upwardly extending portion connected to the base and a retaining surface connected to the upwardly extending portion upon which the used fluid container rests.

Another aspect of the invention is directed to a fluid recovery system for recovering residual fluid residing in a used fluid container, which includes a support for suspending the used fluid container above a collection area in a manner which a bottom portion of the used fluid container is unobstructed; and an opener for forming a hole in the bottom portion of the used fluid container.

The support is further characterized to maintain the used fluid container at a predetermined pitch angle causing the residual fluid to flow toward a low point of the used fluid container and the collection area includes a secondary container. The collection area can includes a scale upon which the secondary container rests.

The support mechanism includes a bracket having a base, an upwardly extending portion connected to the base and a retaining surface connected to the upwardly extending portion upon which the used fluid container rests. The support mechanism includes a bracket having a base disposed adjacent the scale, an upwardly extending portion connected to the base and a retaining surface connected to the upwardly extending portion upon which the used fluid container rests. The support mechanism can pivot about the scale.

Another aspect of the invention is directed to a device for recovering residual fluid from a used fluid container, which includes a support for suspending the used fluid container above a collection area in a manner which a bottom portion of the used fluid container is unobstructed, wherein the support includes a bracket having a base, an upwardly extending portion connected to the base and a retaining surface connected to the upwardly extending portion upon which the used fluid container rests. The base is pivotally connected to the upwardly extending member. The support includes a first bracket for securing about a first part of the scale and can also have a second bracket for securing about a second part of the scale.

A retaining surface is provided by a pair of L-shaped members which are laterally spaced from one another to receive and retain the used fluid container therebetween. An opener with jaw having an upper retaining portion and a lower piercing portion.

Other features of the invention are apparent from the appended claims with reference to the description and the drawings.

DETAILED DESCRIPTION OF PREFERRED EMBODIMENT

Figure 1:
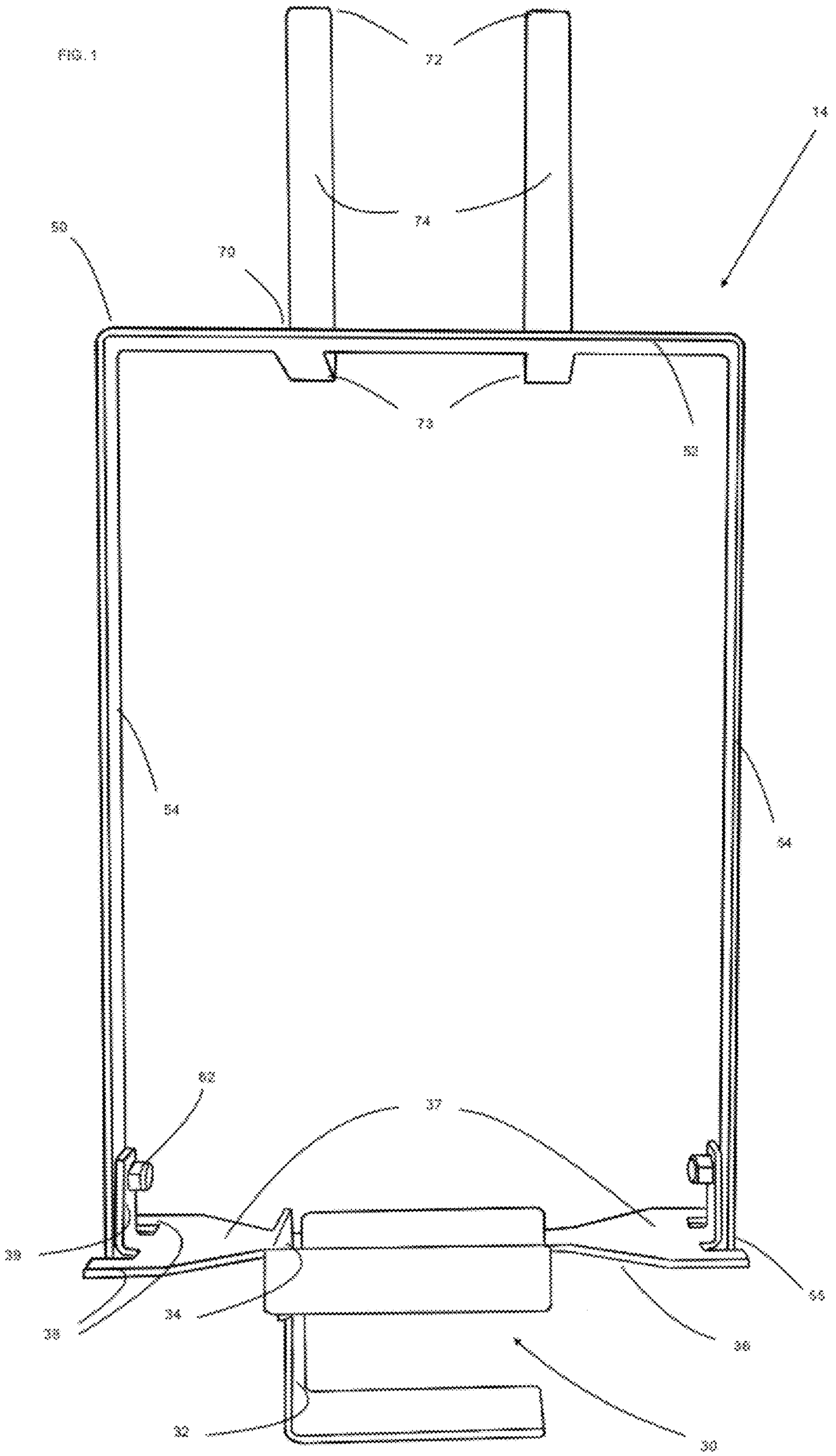
FIG. 1 is a front perpective drawing of a part of the invention.
Figure 2:
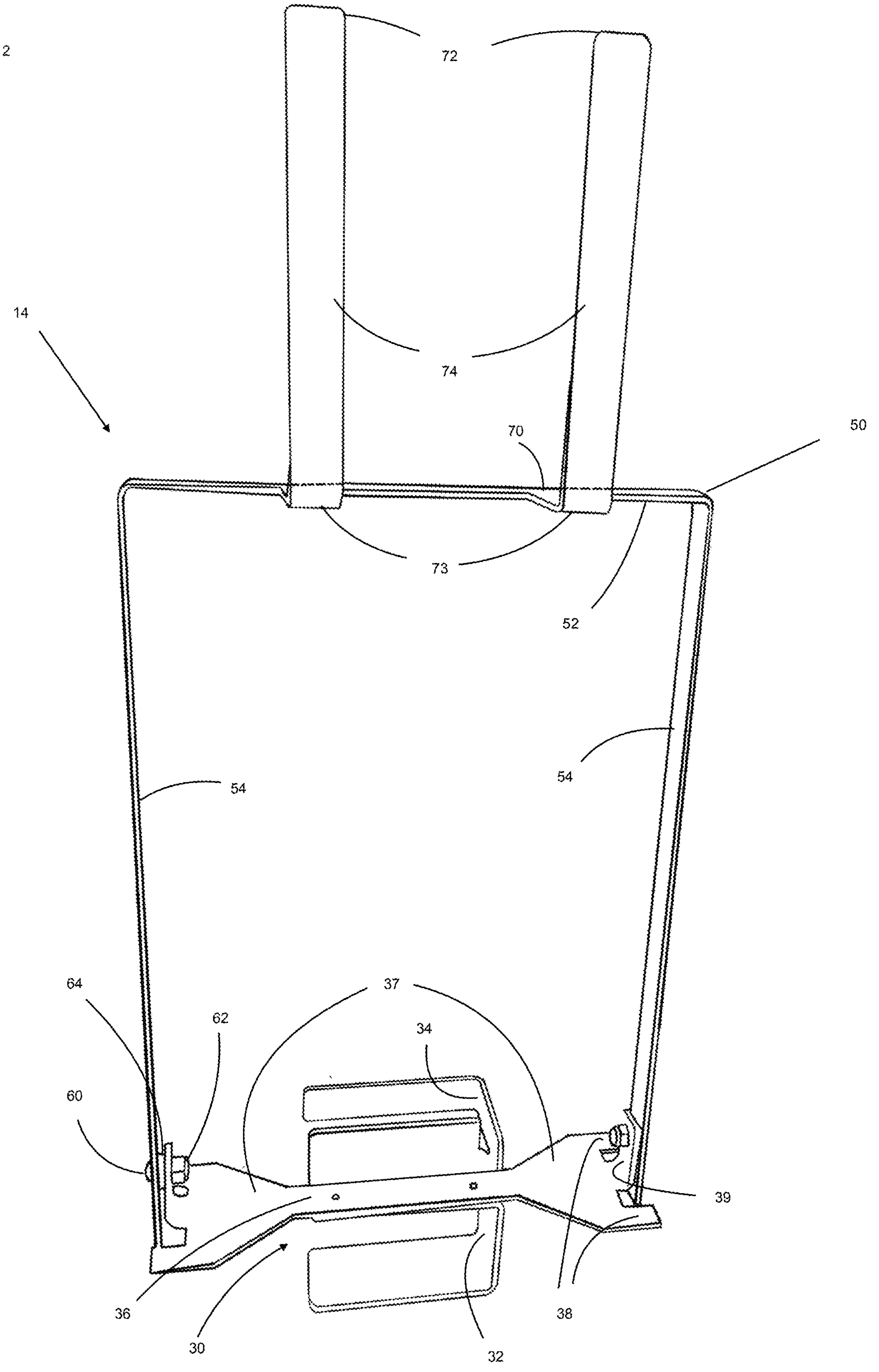
FIG. 2 is a back perspective view of the part in FIG. 1.
Figure 3:
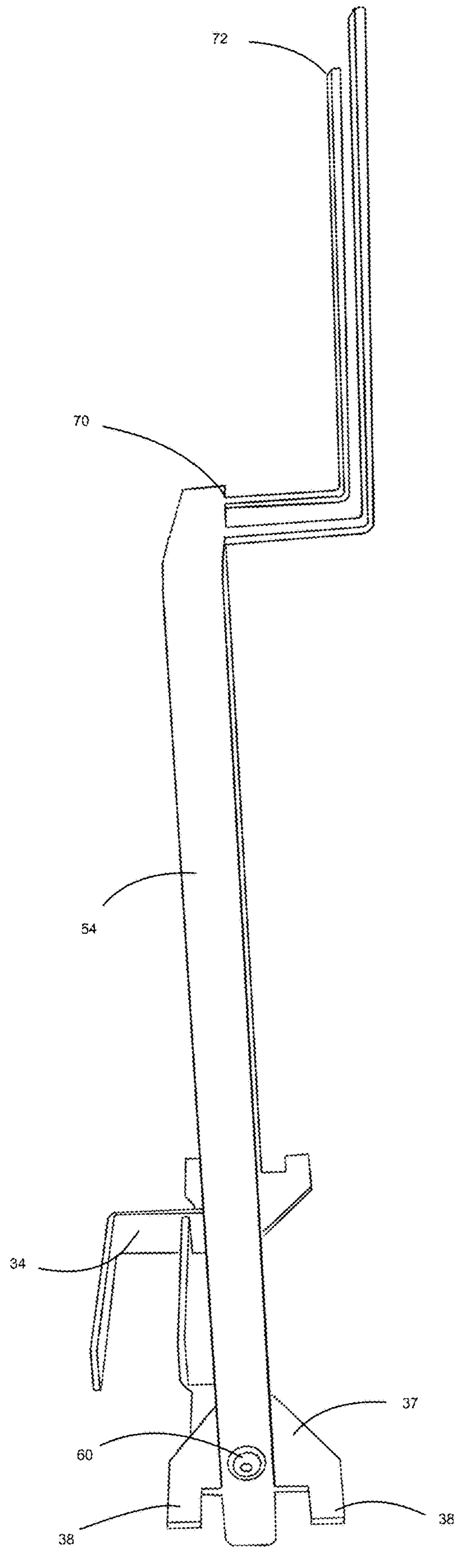
FIG. 3 is a side perspective view of the part in FIG. 1.
Figure 4:
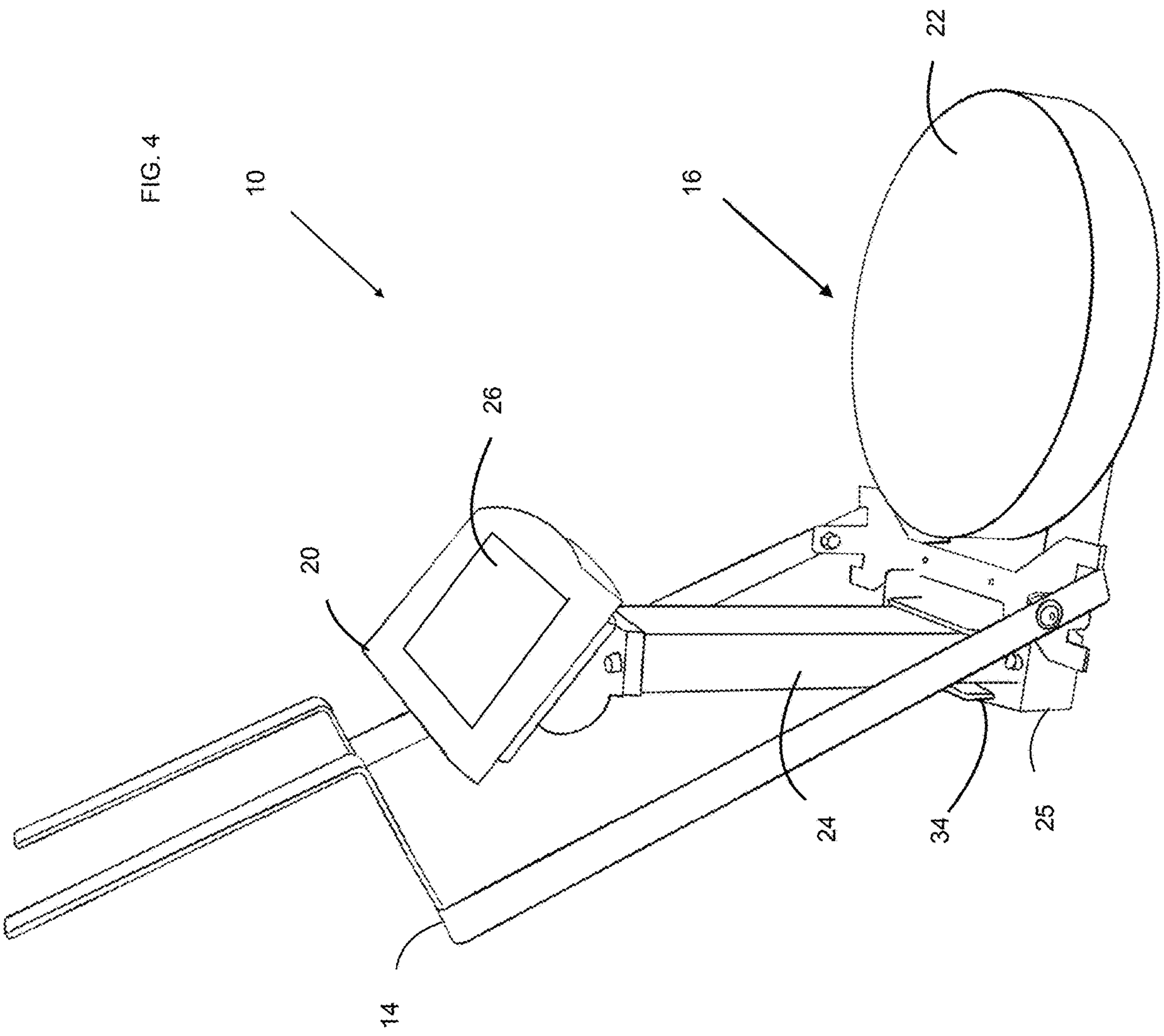
FIG. 4 is a side perspective view of a non-use mode of the invention.
Figure 5:
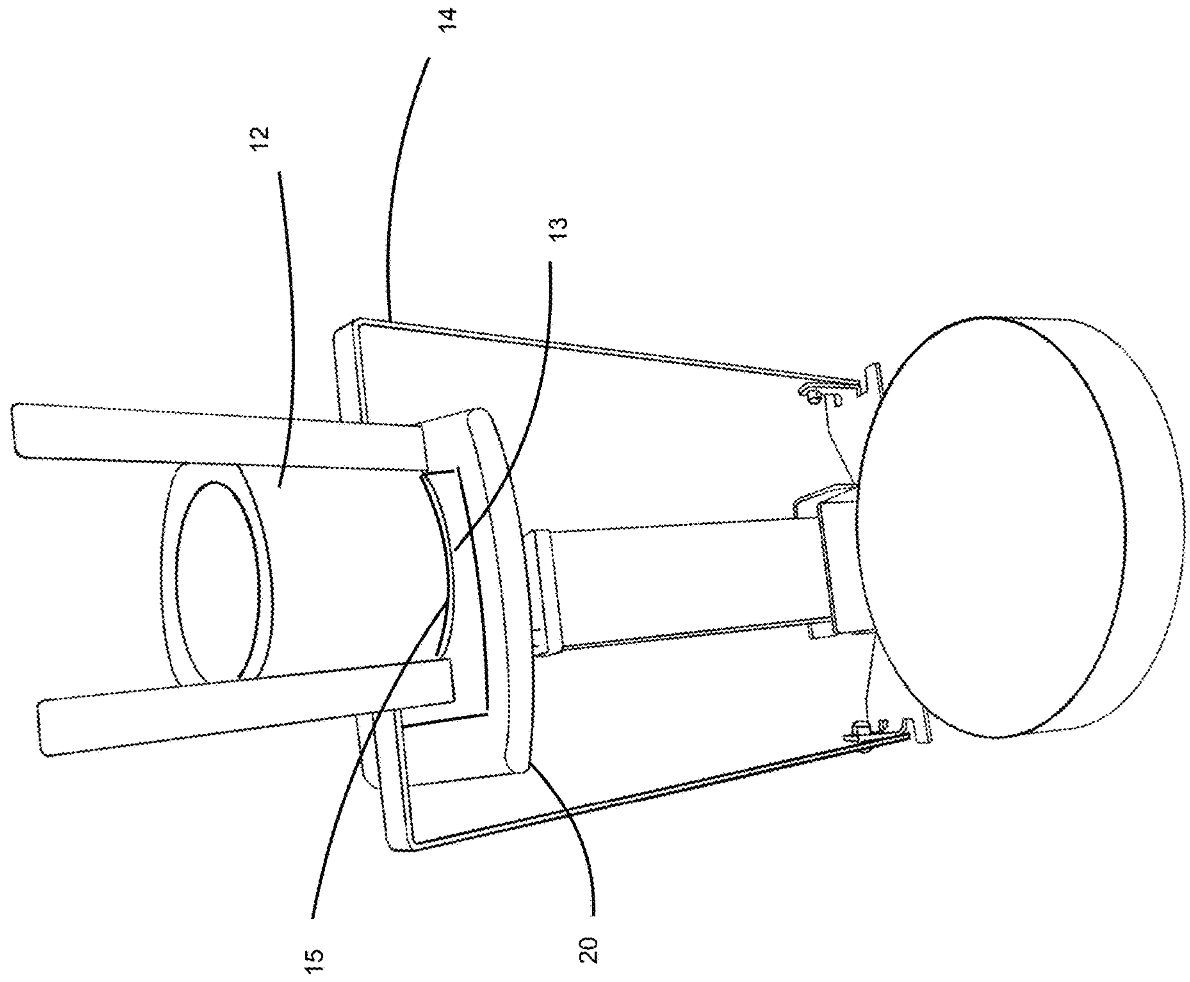
FIG. 5 a perspective view illustrating a step of an in-use mode of the invention.
Figure 6:
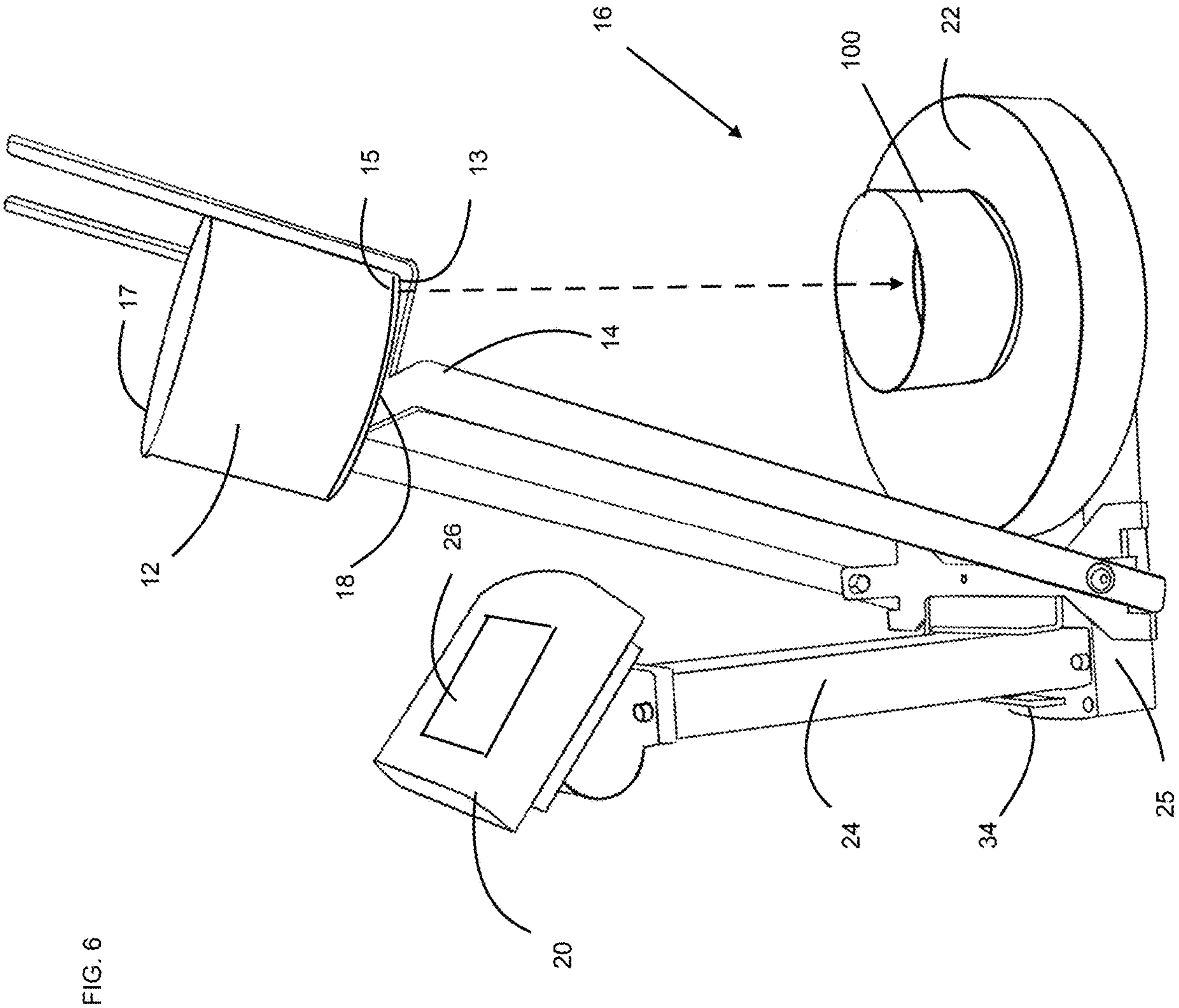
FIG. 6 is a perspective view illustrating another step of the in-use mode of the invention.
Figure 7:
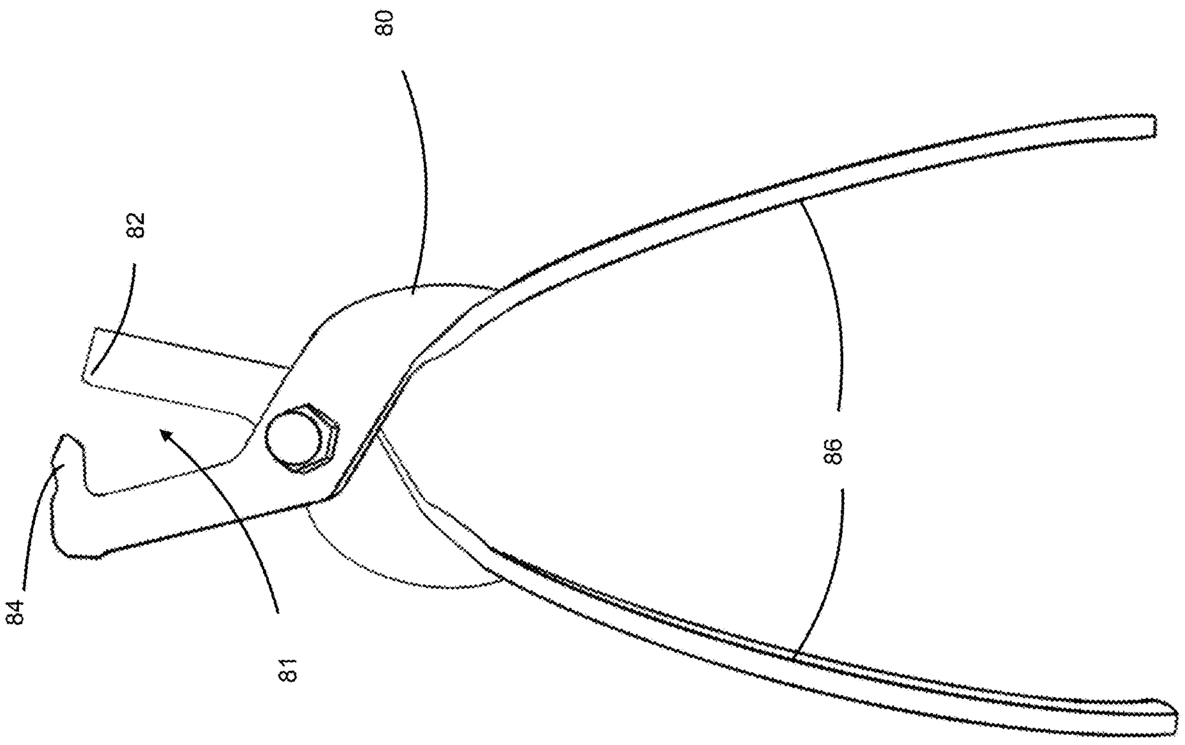
FIG. 7 is a puncturing tool used in the invention.
Figure 8:
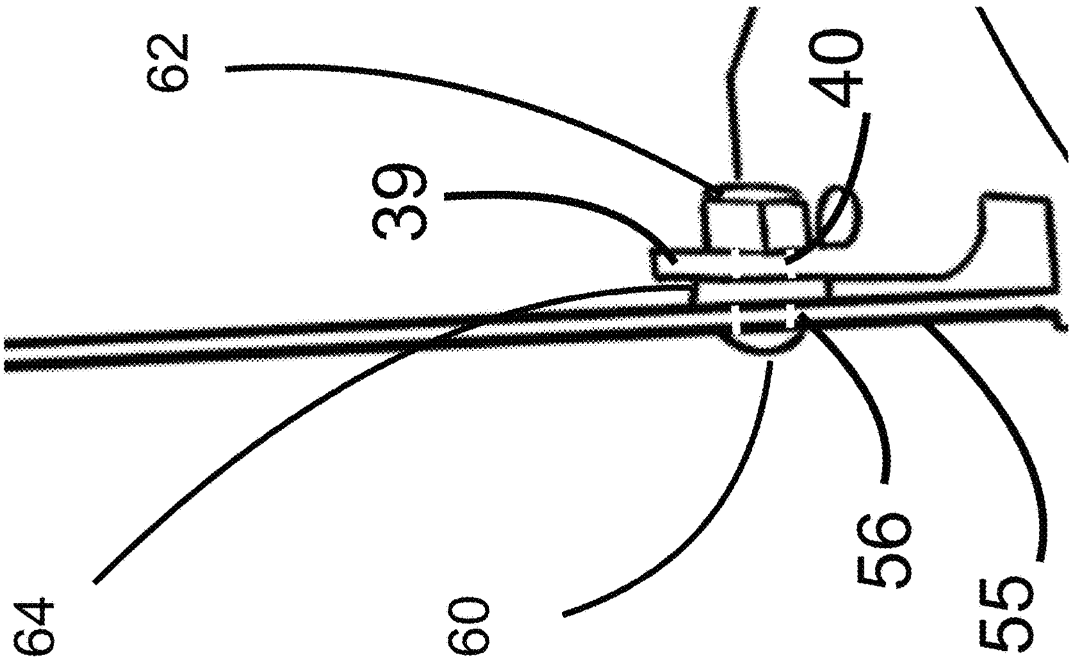
FIG. 8 depicts a blow up portion of FIG. 2.

Referring now to the drawings, the mechanism of the invention is generally referred by the numeral 10. The mechanism 10 is for recovering residual fluid, and in this exemplary disclosure for example is paint, but other liquids are envisioned, from a used fluid container 12 (e.g., a paint can which can be a gallon or quart or industry used size). The mechanism 10 includes a support 14 for suspending the used fluid container 12 above a collection area 16 in a manner in which a bottom portion 18 of the used fluid container 12 is unobstructed.

In this preferred embodiment, the mechanism 10 is for use with a scale 20 which provides a scale surface 22 in the collection area 16. The scale 20 has an upwardly extending arm 24 which extends from a base 25 and connects to a scale readout panel 26. The scale 20 has components therein known to art to facilitate a weight readout.

The support 14 or bracket has a base 30 having a pair of C-shaped bracket portions 32 and 34 which are shown here in a normal (perpendicular) relation to one another to respectively receive parts 25 and 24 of the scale 20. The base 30 has a generally horizontally extending member 36 having lateral forked ends 37 each having two horizontally extending outer retainer extensions 38 and vertically extending inner extension 39 which have coaxially aligned a bolt receiving surface 40.

An upwardly extending portion 50 includes an inverted U-shaped member having an upper horizontal extending portion 52 and downwardly extending arms 54 which each have an end 55 including bolt receiving surface 56 which are co-axially and which can be positioned and aligned adjacent the bolt receiving surfaces 40 and connected by a bolt 60 with a securing nut 62 and washers 64 to permit pivoting. In this regard, the ends 55 extend below the forked ends 37 and thus pivotal angle movement is limited to an in-use mode and non-use mode as understood hereinafter.

A retaining surface 70 is connected to the upwardly extending portion 50 upon which the used fluid container 12 rests. The retaining surface 70 includes a pair of L-shaped members 72 each having a generally horizontally extending portion 73 and a generally vertically extending portion 74, wherein the horizontally extending portion 73 connects to upper horizontally extending portion 52 and extend outward therefrom in a generally common plane providing a surface upon which a used fluid container 12 can rest. The vertically extending portions 74 are laterally spaced from one another to receive and serve to retain the used fluid container 12 therebetween when the mechanism 10 is in use. In an in-use mode the used fluid container 12 is maintained at a predetermined pitch angle, e.g. 5-10 degree pitch, causing the residual fluid to flow toward a low point of the used container. The in-use mode is thus provided.

An opener 80 can be provided having actuatable jaw 81 with an upper retaining portion 82 and a lower piercing portion 84 which can be actuated by handles 86 from an open to closed (piercing) position. Once the used fluid container 12 has been substantially emptied to point where a minimal amount of fluid remains therein, the used fluid container 12 is placed on the horizontally extending portions 52 and 72 and against vertical portions 74 and the inverted U-shaped member pivoted such that gravity maintains the used fluid container 12 in a pitched position with a bottom portion 13 thereof. A fluid recovery method for recovering residual fluid residing in a used fluid container suspend above collection area 16 in a manner in which the bottom portion 13 is unobstructed and residual fluid flows toward the bottom portion 13. A secondary collection container 100 is then disposed on the scale surface 22.

The opener 80 is then employed forms a hole in the bottom portion 13 by using placing the upper retaining portion 82 on a bottom edge 15 of the container 12 and actuating the jaw 81 causing the lower piercing portion 84 to puncture the bottom portion 13 and release substantially all residual fluid into the secondary container 100. To this end, an upper end 17 of the used fluid container 12 should be maintained open to aid in the draining of residual fluid.

As stated, the preferred embodiment envisions the residual fluid to be paint though other fluids are considered within the scope of the invention. In todays markets, it is very common for a gallon of "high end" paint to cost as much as one thousand dollars. Current industry estimates that about a quarter of a pint is often disposed of with a used paint can resulting unnecessary and expensive waste, this is primarily due to the container's in ability to easily remove the paint due to inherent structural limitations of a rim area which contains a lid of the can. By providing the instant invention, there is not only a significant monetary gain in use of substantially all product but also a significant environment impact in not putting potentially hazardous waste into a dump and enables improved waste management and recycling.

There is a fluid recovery method for recovering residual fluid provided which is elegant and easy to use with conventional scale equipment. The invention permits the draining to occur and collect while performing other mixing tasks, such as mixing tints for making another batch of paint and the typical shake time is 15-20 minutes providing enough time to easily capture the residual paint from the used can into another container.

It will be understood that the embodiment of the present invention assembly and method that have been illustrated are merely exemplary and that a person skilled in the art can make variations to the shown embodiment without departing from the intended scope of the invention. All such variations, modifications and alternate embodiments are intended to be included within the scope of the present invention as defined by the claims.

What is claimed is:

1. A fluid recovery method for recovering residual fluid residing in a used fluid container, which includes the steps of:

(a) suspending the used fluid container above a collection area in a manner which a bottom portion of the used fluid container is unobstructed, and wherein said collection area includes a secondary container and a scale upon which said secondary container rests; and (b) forming a hole in the bottom portion of the used fluid container.

2. The fluid recovery method for recovering residual fluid of claim 1, which further includes maintaining an open top on the used fluid container.

3. The fluid recovery method for recovering residual fluid of claim 1, wherein the residual fluid is paint.

4. The fluid recovery method for recovering residual fluid of claim 1, wherein said step (a) is further characterized to maintain the used fluid container at a predetermined pitch angle causing the residual fluid to flow toward a low point of the used container.

5. The fluid recovery method for recovering residual fluid of claim 1, wherein said step (b) includes employing a tool to puncture the bottom of the used container.

6. The fluid recovery method for recovering residual fluid of claim 1, wherein said step (a) includes employing a bracket having a base, an upwardly extending portion connected to said base and a retaining surface connected to said upwardly extending portion upon which the used fluid container rests.

7. A fluid recovery system for recovering residual fluid residing in a used fluid container, which includes:

a support for suspending the used fluid container above a collection area in a manner which a bottom portion of the used fluid container is unobstructed, wherein said collection area includes a scale upon which said secondary container rests; and an opener for forming a hole in the bottom portion of the used fluid container.

8. The fluid recovery system for recovering residual fluid of claim 7, wherein said support is further characterized to maintain the used fluid container at a predetermined pitch angle causing the residual fluid to flow toward a low point of the used fluid container.

9. The fluid recovery system for recovering residual fluid of claim 7, wherein said collection area includes a secondary container.

10. The fluid recovery system for recovering residual fluid of claim 7, wherein said support mechanism includes a bracket having a base, an upwardly extending portion connected to said base and a retaining surface connected to said upwardly extending portion upon which the used fluid container rests.

11. The fluid recovery system for recovering residual fluid of claim 7, wherein said support mechanism includes a bracket having a base disposed adjacent said scale, an upwardly extending portion connected to said base and a retaining surface connected to said upwardly extending portion upon which the used fluid container rests.

12. The fluid recovery system for recovering residual fluid of claim 11, wherein said support mechanism pivots about the scale.

13. A device for recovering residual fluid from a used fluid container, which includes:

a support for suspending the used fluid container above a collection area in a manner which a bottom portion of the used fluid container is unobstructed, wherein said support includes a bracket having a base, an upwardly extending portion connected to said base and a retaining surface connected to said upwardly extending portion upon which the used fluid container rests, wherein said retaining surface includes an L-shaped member which to receive and retain the used fluid container.

14. The device of claim 13, wherein said base is pivotally connected to said upwardly extending member.

15. The device of claim 13, wherein said support includes a bracket for receiving a part of a scale to aid in securing said support.

16. The device of claim 13, which is further characterized to include a first bracket for securing about a first part of the scale and a second bracket for securing about a second part of the scale.

17. A device for recovering residual fluid from a used fluid container, which includes:

a support for suspending the used fluid container above a collection area in a manner which a bottom portion of the used fluid container is unobstructed, wherein said support includes a bracket having a base, an upwardly extending portion connected to said base and a retaining surface connected to said upwardly extending portion upon which the used fluid container rests, wherein said retaining surface includes a pair of L-shaped members which are laterally spaced from one another to receive and retain the used fluid container therebetween.

18. The device of claim 17 wherein said base is pivotally connected to said upwardly extending member.

19. The device of claim 17, wherein said support includes a bracket for receiving a part of a scale to aid in securing said support.

20. The device of claim 19, which is further characterized to include a first bracket for securing about a first part of the scale and a second bracket for securing about a second part of the scale.

21. A device for recovering residual fluid from a used fluid container, which includes:

a support for suspending the used fluid container above a collection area in a manner which a bottom portion of the used fluid container is unobstructed, wherein said support includes a bracket having a base, an upwardly extending portion connected to said base and a retaining surface connected to said upwardly extending portion upon which the used fluid container rests, which further includes an opener with jaw having an upper retaining portion and a lower piercing portion.

22. The device of claim 21, wherein said support includes a bracket for receiving a part of a scale to aid in securing said support.

23. The device of claim 22, which is further characterized to include a first bracket for securing about a first part of the scale and a second bracket for securing about a second part of the scale.

24. The device of claim 21, wherein said base is pivotally connected to said upwardly extending member.

* * * * *